(12) United States Patent
Astrom et al.

(10) Patent No.: US 10,210,394 B2
(45) Date of Patent: Feb. 19, 2019

(54) SYSTEM AND METHOD FOR OCCUPANCY ESTIMATION

(71) Applicant: COGNIMATICS AB, Lund (SE)

(72) Inventors: Karl Astrom, Lund (SE); Marcus Johansson, Lund (SE); Jonna Hellstrom, Lund (SE); Hakan Ardo, Lund (SE); Rikard Berthilsson, Lund (SE)

(73) Assignee: COGNIMATICS AB, Lund (SE)

( * ) Notice: Subject to any disclaimer, the term of this patent is extended or adjusted under 35 U.S.C. 154(b) by 90 days.

(21) Appl. No.: 15/118,198

(22) PCT Filed: Jan. 21, 2015

(86) PCT No.: PCT/EP2015/051147
§ 371 (c)(1),
(2) Date: Aug. 11, 2016

(87) PCT Pub. No.: WO2015/121041
PCT Pub. Date: Aug. 20, 2015

(65) Prior Publication Data
US 2017/0161562 A1    Jun. 8, 2017

(30) Foreign Application Priority Data
Feb. 14, 2014  (SE) ...................................... 1450175

(51) Int. Cl.
*G06K 9/00* (2006.01)
*G07C 9/00* (2006.01)
(Continued)

(52) U.S. Cl.
CPC ......... *G06K 9/00771* (2013.01); *G05B 15/02* (2013.01); *G06T 7/70* (2017.01); *G07C 9/00* (2013.01); *G06T 2207/30242* (2013.01)

(58) Field of Classification Search
USPC ......................................................... 700/302
See application file for complete search history.

(56) References Cited

U.S. PATENT DOCUMENTS 5,971,605 A    10/1999  Aoki et al.
2004/0242126 A1*  12/2004  Takeuchi ................ B24B 37/04
                                                                  451/41
(Continued)

FOREIGN PATENT DOCUMENTS

CN         101188743 A        5/2008
CN         101739653 A        6/2010
(Continued)

OTHER PUBLICATIONS

Glossary (Occupancy Accuracy), Axiomatic Technology Limited, 2013, [online], Retrieved from the Internet <URL:http://www.peoplecounting.co.uk/glossary.html>.
(Continued)

*Primary Examiner* — Jason Lin
(74) *Attorney, Agent, or Firm* — Volpe and Koenig, P.C.

(57) ABSTRACT

An apparatus being adapted to determine an occupancy in a designated area, said apparatus comprising a memory and a controller, said controller being configured to determine at least one passage time; wherein said passage time is a time for a detected passage into and/or out of said area based on said image stream, determine an average occupancy time, determine if a passage into said designated area is estimated to occupy the designated area by comparing the time for the passage with the average occupancy time, and determine an estimation of the present occupancy in the designated area to equal the number of such passages.

11 Claims, 3 Drawing Sheets

(51) Int. Cl.
*G06T 7/70* (2017.01)
*G05B 15/02* (2006.01)

(56) References Cited

U.S. PATENT DOCUMENTS

| | | | |
|---|---|---|---|
| 2006/0067456 A1 | 3/2006 | Ku et al. | |
| 2008/0303662 A1* | 12/2008 | Sorensen | G06Q 30/02 340/541 |
| 2010/0114401 A1* | 5/2010 | Tseng | B60H 1/00742 700/300 |
| 2015/0009332 A1* | 1/2015 | Fuhrmann | G07C 9/00 348/155 |

FOREIGN PATENT DOCUMENTS

| | | |
|---|---|---|
| CN | 103325115 A | 9/2013 |
| WO | 2013128326 A1 | 9/2013 |

OTHER PUBLICATIONS

Stand Alone, HeadCount Systems, 2010, [online], Retrieved from the Internet <URL:http://www .headcountsystems.com/stand alone retail_ store.html>.

Rule-specific intelligence, ObjectVideo, Inc., 2013, [online], Retrieved from the Internet <URL:http://www.objectvideo.com/software/overview/capabilties.html>.

People Counter [Online], Buiiness Insight, [Feb. 17, 2012], Retrieved from the Internet: <URL:http://www.bi3.co/_includes/docs/PC-BI3.pdf>.

TrueView People Counter [Online], Cognimatics, 2013, Retrieved from the Internet: <URL:http://face.cognimatics.com/downloads/axis/people-counter/manualTVPC3.0AxisACAP.pdf>.

Chinese Office Action dated Apr. 18, 2018, in corresponding Chinese Application No. 201580008417.5, with an English translation.

* cited by examiner

SYSTEM AND METHOD FOR OCCUPANCY ESTIMATION

TECHNICAL FIELD

This application relates to a method, a computer-readable medium and an apparatus determining an occupancy in a designated area, and in particular to a method, a computer-readable medium and an apparatus determining an occupancy in a designated area by counting the number of passage into the designated area.

BACKGROUND

It is of great use for shops and stores to be able to determine how many persons are currently occupying an area, such as a store or department of a store. This may be important for safety reasons and also for security reasons.

A variety of people counting systems are well-known and commercially available. In general, occupancy counting systems are based on the difference between the total number of people walking in and out of the area.

One example of such a system is disclosed in US2006067456 which discloses system for counting a number of people or other moving objects entering or leaving a space has a camera which provides an image of an entrance to the space. A data processor identifies moving objects in the image. The data processor is configured to count people or other objects which enter or leave an area within the image for two or more segments of a boundary of the area. Accuracy of the counting system can be monitored by comparing the counts for the different segments.

A disadvantage is that the counting in both directions will start to diverge from the truth, thus making the error to accumulate over time. The propagated error will be in proportion of the total amount of visitors. Since occupancy naturally has a lower physical upper limit than the total amount of visitors during a day, the error will eventually be large enough to render the estimate void.

Another disadvantage is that this method requires calibration from the user. If it can be established that an area is empty or contains a specific amount of people, the error can be removed. If this kind of reset cannot be made, the accumulated error is never removed.

There is thus a need for a more accurate occupancy estimation which doesn't require user calibration.

SUMMARY

It is an object of the teachings of this application to overcome the problems listed above by providing an apparatus adapted to determine occupancy in an area. The apparatus comprising a memory and a controller, said controller being configured to determine at least one passage time; wherein said passage time is a time for a detected passage into and/or out of said area based on said image stream, determine an average occupancy time, determine if a passage into said designated area is estimated to occupy the designated area by comparing the time for the passage with the average occupancy time, and determine an estimation of the present occupancy in the designated area to equal the number of such passages.

It is also an object of the teachings of this application to overcome the problems listed above by providing a method for determining an occupancy in a designated area, said method comprising determining at least one passage time, wherein said passage time is a time for a detected passage into and/or out of said area based on said image stream, determining an average occupancy time, determining if a passage into said designated area is estimated to occupy the designated area by comparing the time for the passage with the average occupancy time and determining an estimation of the present occupancy in the designated area to equal the number of such passages.

It is a further object of the teachings of this application to overcome the problems listed above by providing a computer readable medium comprising instructions that when loaded into and executed by a controller, such as a processor, in an apparatus cause the execution of a method according to herein.

The inventors of the present invention have realized, after inventive and insightful reasoning that by estimating the occupancy based on an average occupancy time the error resulting from erroneous determinations of determining or detecting a passage will be mitigated and the estimated occupancy will not suffer from an error that grows over time. A further adaptation of the estimation and/or an update of the average occupancy time is provided for mitigating any error in determining the estimated occupancy.

The inventors are thus utilizing statistic data, such as average occupancy time, as input to the occupancy estimation in an insightful manner. The statistical data is thus not used just as output data for later analysis by for example sales or security staff, but is actually taken into consideration by the system to provide a more reliable occupancy estimation.

It should be noted that even though the disclosure herein will focus on using a camera to detect a passage, any other sensor for detecting passages may be used instead of or as a compliment to the camera. Examples of such sensors are magnetic switches, electric switches, pressure sensors, Infra Red sensors to name a few.

However, the teachings herein find particular use in systems where the detection of passages may be incorrect, such as in camera based systems.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Further objects, features and advantages will appear from the following detailed description, with reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

The disclosed embodiments are described herein with reference to counting objects, however, the teachings herein may also be applied to counting people, cars, animals or other moving objects.

Figure 1:
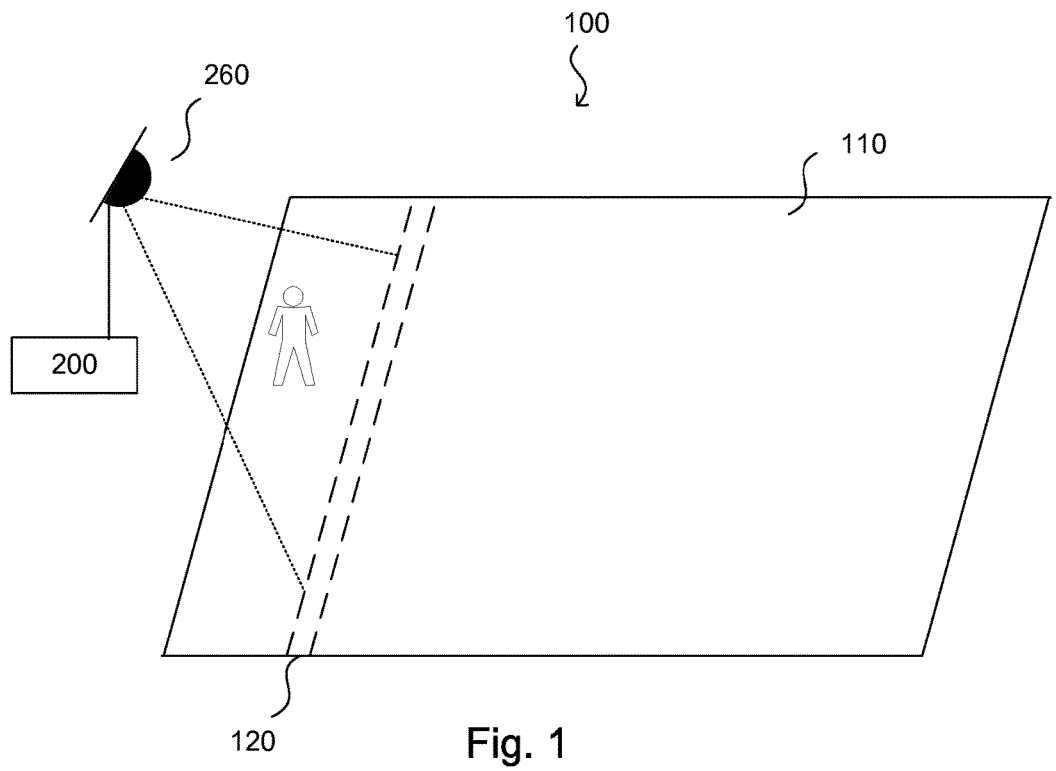
FIG. 1 is a schematic view of a system according to an embodiment of the teachings herein.

FIG. 1 is a schematic view of a system 100 according to the teachings herein. The system 100 comprises a camera 260. The camera 260 is arranged to monitor an entry or exit to a designated area 110. The designated area 110 being an area for which the occupancy is to be determined. One example of such a designated area 110 is a shop, in which example the camera 260 is arranged to monitor the shop entrance. It should be noted that the designated area 110 may be of any shape and may also be an open area or an enclosed area.

The camera 260 is arranged to monitor the entry/exit of the designated area which from now on will be referred to as a passage line 120. The passage line may be a virtual line or, for better accuracy for determining a passage over the passage line 120, an area that an object has to pass through for the camera 260 to register a passage. A passage may thus be both an exit and an entry depending on the direction of the object and a passage time is the time when the passage is detected. In one embodiment the camera 260 comprises a controller which is configured to determine whether a passage is detected or not, and in one embodiment the camera 260 is arranged to provide image data, such as an image stream, to a (remote) controller which determines whether a passage is detected or not.

The camera 260 is connected to (or part of) an apparatus 200 for determining an occupancy in a designated area. It should be noted that the apparatus may comprise at least one camera 260 and/or be connected to at least one camera 260 and that the cameras 260 may be remote and/or comprised in the apparatus 200.

It should also be noted that the camera (or one of the cameras) may be replaced by one or more other passage sensors, such as Infra Red sensors, mechanical gates arranged with magnetic sensors, pressure sensors or other sensors used for detecting a passage.

The occupancy of a designated area is defined as the number of objects, such as people, vehicles, animals, etc that is currently occupying the designated area.

Figure 2:
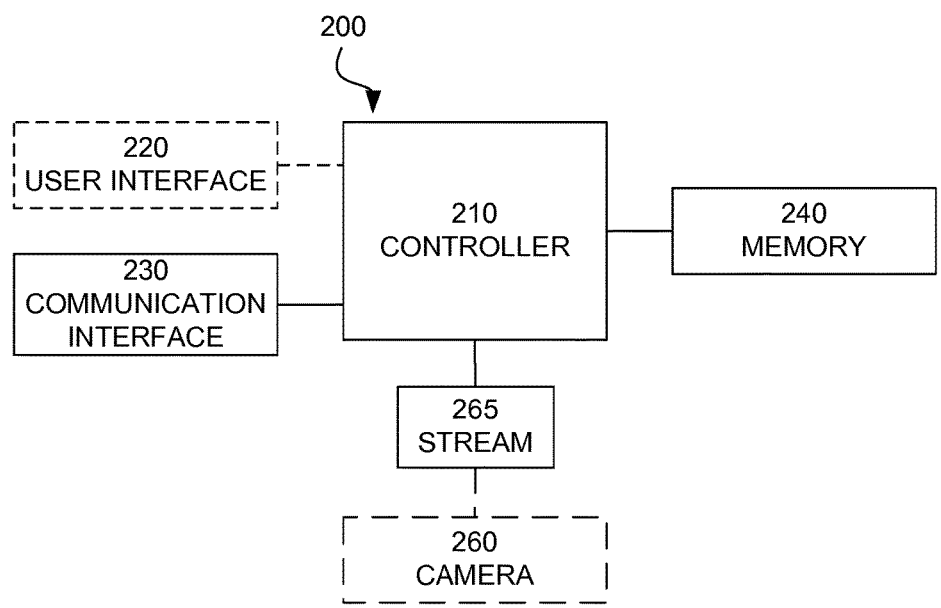
FIG. 2 is a schematic view of the components of an apparatus according to an embodiment of the teachings herein.

FIG. 2 shows a schematic view of the general structure of such an apparatus. The apparatus 200 comprises a controller 210 which is configured to determine at least one passage time; wherein said passage time is a time for a detected passage into and/or out of said area based on an image stream received from the at least one camera 260. It should be noted that the controller 210 of the apparatus may be a controller for the camera 260. The controller may in one embodiment be configured to determine the at least one passage time by receiving the passage time from a controller of the camera 260. In the case where the camera has an internal controller for providing data on passage times to the controller 210 of the apparatus, the camera controller is taken to be comprised in the controller 210 of the apparatus for the purposes of this description. How a passage and a passage time is determined is well-known in the art and will not be discussed in further detail.

The controller 210 is also responsible for the overall operation of the apparatus 200 and is preferably implemented by any commercially available CPU ("Central Processing Unit"), DSP ("Digital Signal Processor") or any other electronic programmable logic device. The controller 210 is configured to read instructions from a memory 240 and execute these instructions to control the operation of the apparatus 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions The apparatus 200 further comprises a communication interface 230, which is adapted to allow the apparatus 200 to communicate with other devices through the use of different communication technologies. Such communication technologies may be wired or wireless. Examples of such wired technologies are Universal Serial Bus (USB) and Ethernet to name a few. It should be noted that other technologies exist and are taken to be an obvious equivalent for such wired communication interfaces. Examples of such wireless technologies are IEEE 802.11, IEEE 802.15, ZigBee, WirelessHART, WIFI, Bluetooth®, W-CDMA/HSPA, GSM, UTRAN and LTE to name a few. It should be noted that other technologies exist and are taken to be an obvious equivalent for such wireless communication interfaces.

As has been disclosed in the above, the apparatus 200 is further equipped with a camera 260. The camera 260 is a digital camera that is arranged to take video or still photographs by recording images on an electronic image sensor (not shown).

The camera 260 may be operably connected to the controller 210 to provide the controller with a video stream 265, i.e. the series of images captured, for further processing possibly for determining a passage time.

In one embodiment the apparatus 200 is housed in a same housing (not shown) as the camera 260.

In one embodiment the camera 260 is an external camera or source of an image stream.

The apparatus 200 further comprises a user interface 220 for presenting occupancy information to a user, and possibly for receiving user commands relating to settings or control of the apparatus 200.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
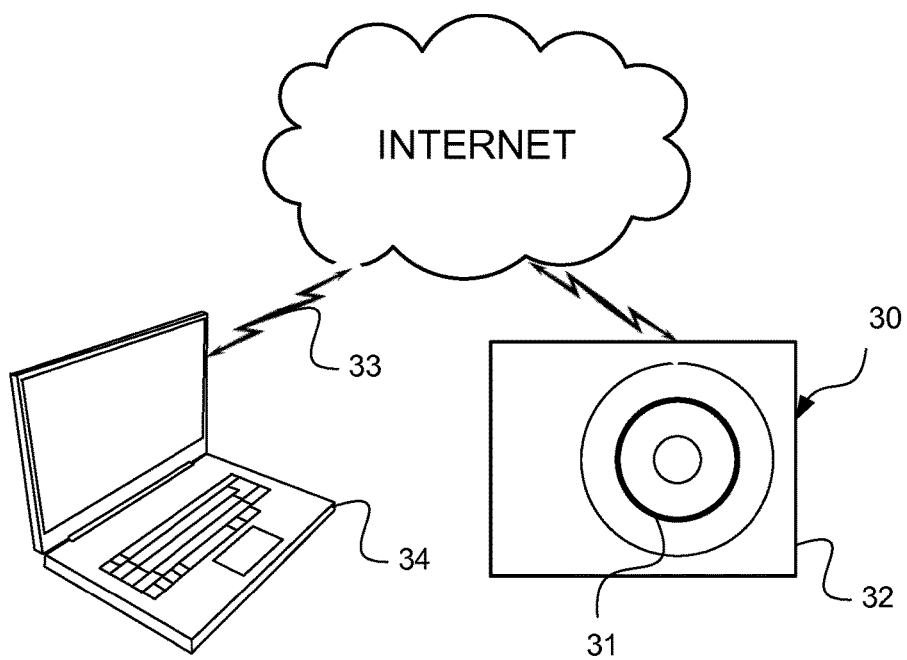
FIG. 3 is a schematic view of a computer-readable memory according to an embodiment of the teachings herein.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 34, such as an apparatus 200 according to FIG. 2, possibly being a computer or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a computer-readable medium 30.

The instructions may be stored in a memory (not shown explicitly in FIG. 3, but referenced 240 in FIG. 2) of the computer 34.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As will be apparent to those skilled in the art, many alterations and modifications are possible in the practice of the teachings herein without departing from the spirit or scope thereof.

The apparatus 200 is configured to determine the occupancy of a designated area 110, by making an estimation of the number of objects presently occupying the designated area 110. The estimation is based on an average occupying time Ta spent in the designated area 110.

The inventors have realized after careful and insightful reasoning that the number of objects presently occupying a designated area 110, may be estimated by assuming that all objects exit the designated area after the average occupying time Ta. Based on this the controller 210 is configured to determine the occupancy in an area by determining how many objects have entered within the last time equal to the average occupying time.

One manner of determining this is to determine which passage times P for objects that have passed into the area in the last average occupancy time. The estimation sum OCC can be described as:

$$OCC = \sum_{j=1}^{N} f(Pj)$$

$$f(P) = 1 \text{ if } P > T - Ta; \text{ and } 0 \text{ if } P \leq T - Ta$$

where T is the present time, Ta is the average occupying time, P is the passage time, and N is the number of entry passages.

By comparing the present time to a passage time and determine if the present time exceeds or is equal to sum of a passage time (P) and an average occupancy time (Ta), the controller can determine or estimate whether the object entering at passage time (P) is still inside the area or have left the area. If it is estimated that the object is still in the area, the estimation sum OCC will be increased by 1. The controller then determines that occupancy for the designated area 110 is given by the estimation sum OCC.

The estimation sum OCC is cleverly defined so that it can not take a negative value and the error is proportional to the current occupancy, not the total amount of objects counted during the day. As such any error will not be cumulative as in the prior art. This is highly beneficial as a system would not need to be restarted or reset continuously to reduce the error.

Also, the error is inversely proportional to the number of occupants and will therefore decrease (at least relatively seen) as the number of occupants grows. As occupancy counting systems are used foremostly for counting large number of occupants, this feature is highly beneficial.

Another manner of determining the estimation of the occupancy is to maintain a set of occupants and determine the size of this set to be the estimation of the occupancy. The occupant set is generated by including all passages that have a passage time P which is within the last average occupancy time, that is P>T−Ta. This can be expressed as:

$$OCC = |O|; P \in O \text{ if } P > T - Ta$$

where O is the occupant set.

This has the benefit that the determination of the estimation requires fewer comparisons.

In one embodiment, where the average occupancy time is dynamic, the controller may be configured to maintain a set of passages that is larger than the occupancy set so that the occupancy set may be amended to include older passages P should the average occupancy time increase.

In one embodiment the controller is configured to determine the average occupancy time by weighting the passage times so that older passages are given less importance than more recent passages. This is especially useful for systems estimating the occupancy over longer time periods and allows for increasing the accuracy of the determination. In one embodiment the controller is configured to apply a linear weighting to the passage times. In one embodiment the controller is configured to apply a non-linear weighting to the passage times.

This is based on that the longer time that has lapsed since the passage, the higher the likelihood that the occupant has already left the designated area.

To be able to make an accurate estimation of the occupancy it is important to determine an average occupancy time (Ta).

In one embodiment the controller may be configured to determine an average occupancy time (Ta) by assigning a preset or received average occupancy time.

In one embodiment, the controller is configured to determine the average occupancy time by storing a passage time for when an object has passed into (Pi) or out of (Po) the designated area 110. The average occupancy time (Ta) is then based on a difference between at least one passage time into an area (Pi) and at least one passage time out of an area (Po). In one embodiment, the controller is configured to determine the average occupancy time by the difference between the at least one passage time into and the at least one passage time out of the designated area 110 over time, that is to determine the average occupancy time based on a plurality of passages.

In one embodiment, the controller is configured to determine the average occupancy time based on a mean value of the difference between the at least one first passage time and the at least one second passage time over time. This may be expressed as $$Ta = \frac{1}{M}\sum_{j=1}^{M} Poj - \frac{1}{N}\sum_{j=1}^{N} Pij$$

where M is the number of passages out Po and N is the number of passages in Pi.

This takes into account all data gathered for a system. However, as the number of passages into (N) the designated area 110 will be greater (or equal) to the number of passages out of (M) the designated area 110, there will be an inherent error in calculating the average occupancy time in this manner. To overcome this error, the average occupancy time may also be calculated as:

$$Ta = \frac{1}{M}\sum_{j=1}^{M} Poj - \frac{1}{M}\sum_{j=1}^{M} Pij$$

It should be noted that the average occupancy time can be updated continuously or at intervals. The average occupancy time will, in such embodiments, be dynamic.

To accommodate for changes in behaviour of the objects and also for other changes, the controller is, in one embodiment, configured to weight the passage times into and out of the designated area 110 so that older times are less prominent when determining the average occupancy time. This allows for taking recent changes in behaviour into account when determining the average occupancy time. In such an embodiment the controller is configured to determine the average occupancy time by using at least one weight function w. The weight function (w) is based on an estimation (Te) of the average occupancy time. Many possible weight functions can be used, and one example may be:

$wi(P,Te)=wo(P-Te)$ if $P<T-Te$; and 0 otherwise and $wo(P)=e^{-c(T-Tk-P)}$ if $P<T-Tk$; and 1 otherwise where wi is the weight function for passages into the area, wo is an example of the weight function for passages out of the area and c and Tk are constants. Example values of c and Tk are c=0.008 and Tk=200.

It should be noted that the estimation is not dependent on any specific weight function, both linear and non-linear weight functions may be used. The purpose of the weight function is to attenuate older passages. Objects who passed into the area more recent than Te time ago, are more likely to still be in the area than to have left it.

In one embodiment, the average occupancy time (Ta) is determined by $$Ta = g(Te) = \frac{\sum_{j=1}^{M} wo(Poj) \cdot Poj}{\sum_{j=1}^{M} wo(Poj)} - \frac{\sum_{j=1}^{N} wi(Pij, Te) \cdot Pij}{\sum_{j=1}^{N} wi(Pij, Te)}$$

In such embodiments the average occupancy time will be more accurate when the estimation (Te) of the average occupancy time is close to the true average occupancy time (Ta).

The controller may determine the estimated average occupancy time (Te) as the difference of the times for the passages in to the designated area and the times for the passages out of the designated area as has been disclosed above. In one embodiment the estimated average occupancy time is determined for the 10, 20, 50 or 100 first passages.

To obtain a more accurate average occupancy time (Ta) the controller is configured to determine a difference between an estimated occupancy time and the calculated occupancy time based on that estimated occupancy time. This can be expressed as:

$Ta = \mathrm{argmin}_{Te \in A} |g(Te) - Te|$ where A is a set of possible estimations.

The exact number of possible estimations in A depends on the actual usage. As an example the possible estimations for a department store may be the set of [3 to 45] minutes.

As the function for determining the average occupancy time based on a minimum discrepancy may provide more than one minimum, the controller may be configured to determine the average occupancy time (Ta) as the first maximum, i.e. the smallest estimation providing a minimum.

The set A may be divided into a subset by determining an initial average occupancy time by determining the difference of the times for the passages in to the designated area and the times for the passages out of the designated area as has been disclosed above and centering the subset of A around this difference. To illustrate with an example: if the 10 first passages in and out indicate an initial average occupancy time of 14 minutes, the set A may be reduced to the subset [9 to 19] minutes. This will provide an average occupancy time that is close to a true average occupancy time and reduce the risk of using a false average being a result of selecting an incorrect or false minima.

Figure 4:
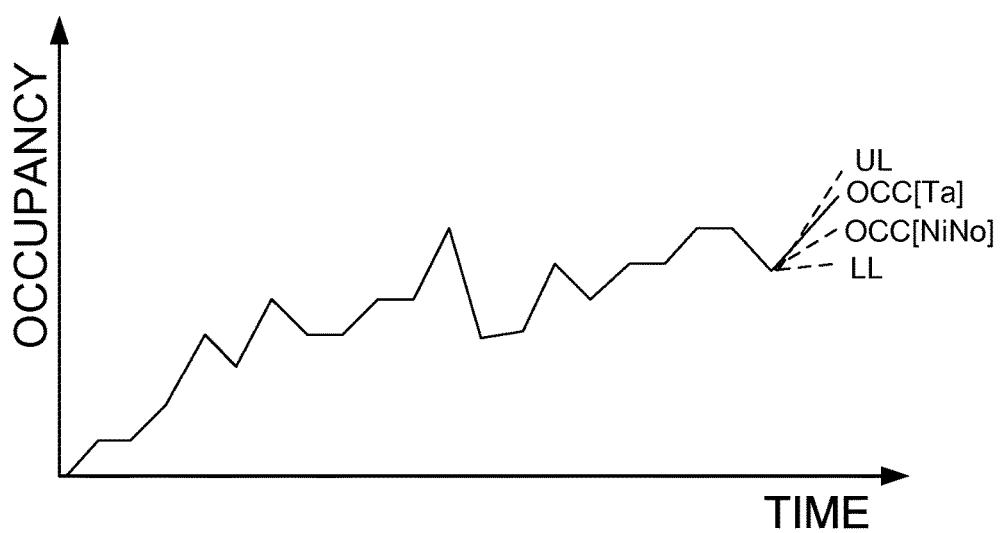
FIG. 4 is a schematic view of a determined occupancy of an apparatus according to an embodiment of the teachings herein.

The apparatus may further be configured to adapt the estimated occupancy by comparing the estimation to a determined change in occupancy. FIG. 4 shows a graph of the estimated occupancy over time. The graph shows how the occupancy estimation changes over time for a given average occupancy time.

As the apparatus is configured to determine the occupancy based on the average occupancy time without counting any passages out of the designated area (apart from a dynamic update of the average occupancy time) there may be an error present in the estimated occupancy. To accommodate for this error, the apparatus 200 may be configured to adapt the estimation by detecting the actual number of passages in (Ni) and the number of passages out (No) of the designated area 110 over a time period (Tx). The actual change of the estimated occupancy would then equal the difference between the number of passages in and the number of passages out of the designated area 110. In other words:

$OCC(T) = OCC(T-Tx) + Ni - No$ where T is the present time, OCC(T) is the estimated occupancy at time T and OCC(T-Tx) is the estimated occupancy a time period Tx before the present time T.

This calculation may be used to determine whether the average occupancy time (Ta) used is a good estimate or not. If the difference between present occupancy being determined based on the average occupancy time as above (OCC[Ta]) and the present occupancy being determined based on a previous occupancy and the number of passages in and out of the designated area (OCC[NiNo]) is large, the average occupancy time being used is not a good one and could be updated.

The apparatus may thus be configured to regularly or from time to time determine the reliability of the average occupancy time and if it is determined that the average occupancy time is not reliable, the apparatus will update the average occupancy time. The average occupancy time is determined to be reliable if the difference between the two occupancies is above a threshold, i.e. if $$|(OCC[Ta])-(OCC[NiNo])|<\text{Threshold1}$$

then the average occupancy time is reliable. The threshold may be selected depending on the time period used for determining the reliability (Tx) and the actual application, i.e. the size and use of the designated area. In one embodiment the threshold is based on the number of passages during for example one minute (or the time period Tx). In one embodiment the threshold is set to 10% of the number of passages. The passages may be passages in to and/or passages out of the designated area.

In one embodiment the time period used for determining the reliability (Tx) is 1 minute. In one embodiment Tx is 1-5 minutes. In one embodiment Tx is 1-10 minutes.

The update may be performed in any of the manners disclosed above for determining the average waiting time. If the difference between the two occupancies is positive the average occupancy time should be decreased. If the difference between the two occupancies is negative the average occupancy time should be increased.

A correctly determined average occupancy time would result in the two occupancies being very close to equal, $|(OCC[Ta])-(OCC[NiNo])|\sim 0$.

The apparatus may also be configured to determine whether the present occupancy being determined based on the average occupancy time as above (OCC[Ta]) diverges from the present occupancy being determined based on a previous occupancy and the number of passages in and out of the designated area (OCC[NiNo]) and in response thereto adapt the estimated occupancy. In other words, if the occupancy based on the average occupancy time is outside an upper limit (UL) or a lower limit (LL) from the occupancy estimate based on a previous occupancy the determined occupancy estimation is determined to be inside the two limits. In one embodiment the occupancy estimation is set to equal the occupancy determined based on a previous occupancy.

In one embodiment the apparatus is configured to determine a new average occupancy time and base the occupancy estimation on the newly determined average occupancy time.

Figure 5:
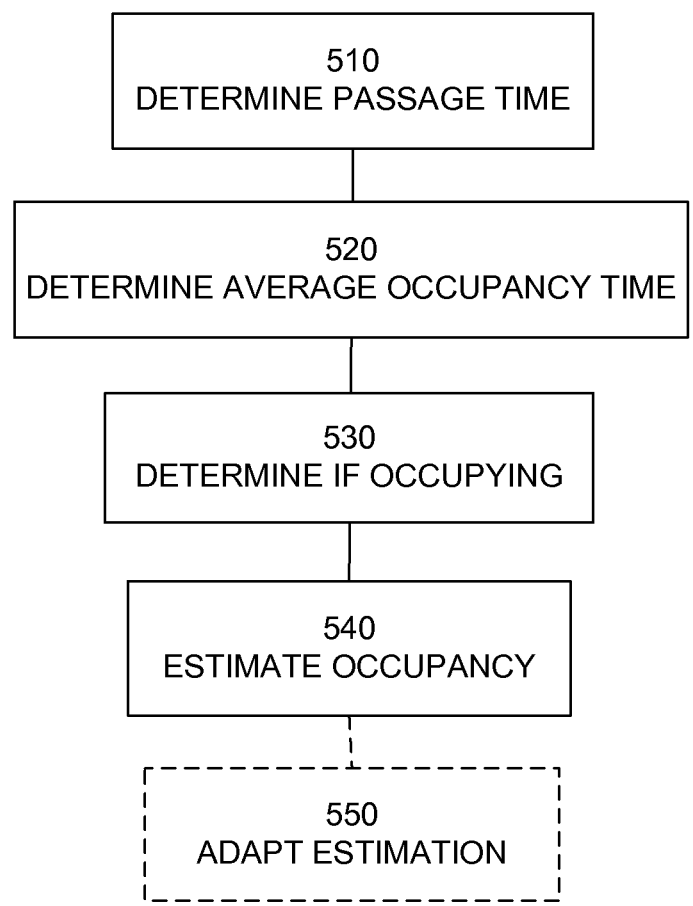
FIG. 5 is a flowchart of a method according to an embodiment of the teachings herein.

FIG. 5 shows a flowchart for a general method of the teachings herein. At least one passage time (P) is determined 510 and based on this, an average occupancy time is determined 520. It is then determined if a passage 530 into a designated area can be estimated to still be in, i.e. still occupy, the designated area by comparing the time for the passage with the present time and the average occupancy time 530 and determine an estimation 540 of the present occupancy in the designated area to equal the number of such passages. The average occupancy time can be determined as a weighted average or as a linear difference of passage times as has been disclosed above.

To accommodate for errors, the estimated occupancy may be adapted 550 based on the number of actual passages into and out of the designated area.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus adapted to determine an occupancy in a designated area, said apparatus comprising: a sensor; a memory and a controller, said controller being configured to:
   detect at least one passage of a person into said area based on an image stream provided by said sensor;
   determine a passage time; wherein said passage time is a time for the detected passage;
   determine an average occupancy time;
   determine an estimation of a present occupancy in the designated area by
     determining whether the at least one detected passage is estimated to occupy the designated area by determining a present time and comparing said present time to the sum of said passage time corresponding to said at least one detected passage and the average occupancy time and if said present time is smaller than or is equal to the sum of the passage time corresponding to said at least one detected passage and the average occupancy time, then increasing an estimation sum and determining said occupancy in said area as said estimation sum; and
   upon determining said occupancy, outputting said determined occupancy to a user interface.

2. The apparatus according to claim 1, wherein said controller is further configured to determine the average occupancy time based on a difference between at least one first passage time into the designated and at least one second passage time out of the designated area, wherein said controller is further configured to determine the average occupancy time based on a mean value of the difference between the plurality of first passage times and the plurality of second passage times over time.

3. The apparatus according to claim 2, wherein said controller is further configured to determine the average occupancy time by attenuating older passage times using a weight function.

4. The apparatus according to claim 3, wherein said weight function is based on an estimation of a present average occupancy time.

5. The apparatus according to claim 4, wherein said controller further is configured to determine the average occupancy time by determining a minimum difference between a weighted previous average occupancy time and said estimated occupancy time over time.

6. The apparatus according to claim 3, wherein said controller further is configured to determine the estimated average occupancy time based on a difference between at least one first passage time into an area and at least one second passage time out of an area.

7. The apparatus according to claim 1, wherein said estimation sum is increased by 1.

8. The apparatus according to claim 1, wherein said controller further is configured to adapt the estimation of the occupancy by:
   detecting a number of passages in to and a number of passages out of the designated area over a time period;
   determine whether an occupancy estimation is outside an upper limit or a lower limit from a sum of a previous occupancy estimation and said the number of passages in to and the number of passages out of the designated area over said time period, and if so
     adapt the occupancy estimation.

9. The apparatus according to claim 1, wherein said controller further is configured to adapt average occupancy time by:
  detecting a number of passages in to and a number of passages out of the designated area over a time period;
  determine whether a difference between an occupancy estimation and a sum of a previous occupancy estimation and said the number of passages in to and the number of passages out of the designated area over said time period is greater than a threshold value, and if so update the average occupancy time.

10. A method for determining an occupancy in a designated area, said method comprising:
  using a sensor to generate an image stream;
  using a controller to:
    detect at least one passage of a person into said area based on the image stream;
    determine a passage time; wherein said passage time is a time for the detected passage;
    determine an average occupancy time;
    determine an estimation of a present occupancy in the designated area by:
      determining whether the at least one detected passage is estimated to occupy the designated area by determining a present time and comparing said present time to the sum of said passage time and the average occupancy time corresponding to said at least one detected passage and if said present time is smaller than or is equal to sum of the passage time corresponding to said at least one detected passage and the average occupancy time, then increasing an estimation sum and determining said occupancy in said area as said estimation sum; and
  outputting said determined occupancy to a user interface.

11. A computer readable storage medium encoded with instructions that, when loaded and executed on a controller of an apparatus, causes the method according to claim 10 to be performed.

* * * * *